United States Patent
Chen

(10) Patent No.: US 10,929,720 B2
(45) Date of Patent: Feb. 23, 2021

(54) IMAGE PROCESSING METHOD, IMAGE PROCESSING APPARATUS, AND COMPUTER STORAGE MEDIUM

(71) Applicant: BOE TECHNOLOGY GROUP CO., LTD., Beijing (CN)

(72) Inventor: Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 30 days.

(21) Appl. No.: 16/399,683

(22) Filed: Apr. 30, 2019

(65) Prior Publication Data
US 2020/0034667 A1 Jan. 30, 2020

(30) Foreign Application Priority Data
Jul. 27, 2018 (CN) .......................... 20180847581.0

(51) Int. Cl.
*G06K 9/62* (2006.01)
*G06K 9/72* (2006.01)
*G06T 5/50* (2006.01)

(52) U.S. Cl.
CPC ......... *G06K 9/6262* (2013.01); *G06K 9/6256* (2013.01); *G06K 9/726* (2013.01); *G06T 5/50* (2013.01); *G06T 2207/20081* (2013.01); *G06T 2207/20084* (2013.01); *G06T 2207/20221* (2013.01)

(58) Field of Classification Search
CPC .... G06K 9/6262; G06K 9/726; G06K 9/6256; G06T 5/50; G06T 2207/20081; G06T 2207/20221; G06T 2207/20084
USPC ....................................................... 382/175
See application file for complete search history.

(56) References Cited

U.S. PATENT DOCUMENTS 10,445,921 B1 * 10/2019 Li ............................ G06T 13/80
2016/0026253 A1 * 1/2016 Bradski ................ H04N 13/344
345/8

* cited by examiner

*Primary Examiner* — Congvan Tran
(74) *Attorney, Agent, or Firm* — Kinney & Lange, P.A.

(57) ABSTRACT

An image processing method, an image processing apparatus, and a computer storage medium are disclosed. The image processing method includes: acquiring a first still image; acquiring a first moving image comprising a plurality of image frames; performing segmentation on the first still image to obtain a first feature region in the first still image; acquiring a binary mask image of the first feature region; and performing image fusion on the first still image and the plurality of image frames based on the binary mask image to obtain a second moving image.

10 Claims, 4 Drawing Sheets

IMAGE PROCESSING METHOD, IMAGE PROCESSING APPARATUS, AND COMPUTER STORAGE MEDIUM

CROSS-REFERENCE TO RELATED APPLICATION(S)

This application claims priority to the Chinese Patent Application No. 201810847581.0, filed on Jul. 27, 2018, which is incorporated herein by reference in its entirety.

TECHNICAL FIELD

Embodiments of the present disclosure relate to multimedia technology, and more particularly, to an image processing method, an image processing apparatus, and a computer storage medium.

BACKGROUND

Image segmentation techniques are techniques which are widely used in digital image processing. In the image segmentation techniques, it is required to acquire a specified target by performing segmentation on complex image content according to features of the specified target. Image fusion techniques aim to synthesize structural features of other images into a target image while realizing a continuous and natural synthetic boundary, which may achieve the purpose of enhancing image information or adding image content.

However, when image segmentation and image fusion processing are performed on a sky in the night or a sky when there is dense fog, the image acquired through fusion has a poor effect.

SUMMARY

The following description is a summary of subject matters described in detail herein. This summary is not intended to limit a protection scope of claims.

The embodiments of the present disclosure provide an image processing method, an image processing apparatus, and a computer storage medium.

According to one aspect of the embodiments of the present disclosure, there is further provided an image processing method, comprising:
  acquiring a first still image;
  acquiring a first moving image comprising a plurality of image frames;
  performing segmentation on the first still image to obtain a first feature region in the first still image;
  acquiring a binary mask image of the first feature region; and
  performing image fusion on the first still image and the plurality of image frames based on the binary mask image to obtain a second moving image.

In an example, performing segmentation on the first still image comprises:
  processing the first still image using a preset depth convolutional neural network to acquire the first feature region by performing segmentation on the first still image.

In an example, processing the first still image using a preset depth convolutional neural network comprises:
  extracting semantic feature layers at two or more scales from the first still image based on a pre-trained network;
  learning all the extracted semantic feature layers using a preset optimization network to obtain features at respective scales;
  merging and interpolating the features at the respective scales using the optimization network; and
  training the optimization network using the merged and interpolated features to predict the first still image and acquire the first feature region by performing segmentation on the first still image, and outputting the first feature region acquired in a binary mask image manner.

In an example, the method further comprises: prior to performing segmentation on the first still image,
  training the depth convolutional neural network using a preset loss function as an objective function;
  wherein the loss function is $$\text{Loss} = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

In an example, the method further comprises: prior to fusing the first still image with the plurality of image frames,
  decomposing each of the plurality of image frames into a plurality of color channel images;
  calculating a pixel mean value of each of the plurality of color channel images to obtain a primary tone reference image $I_{ref}$;
  performing Gaussian blurring processing on a second feature region $I_{gd}$ of the first still image at a preset scale of the two or more scales to obtain a blurred image $I_{blur}$; and
  performing color correction on the second feature region $I_{gd}$ according to following equation to obtain a corrected image $I_{cal}$:

$$I_{cal} = I_{gd} * \alpha + I_{gd} * (I_{ref}/I_{blur}) * (1-\alpha);$$

wherein the second feature region $I_{gd}$ comprises other regions of the first still image expect for the first feature region, and α is a correction scale factor, wherein $0 \leq \alpha \leq 1$.

According to another aspect of the embodiments of the present disclosure, there is further provided an image processing apparatus, comprising:
  a memory having instructions stored thereon;
  a processor configured to perform the instructions to:
  acquire a first still image;
  acquire a first moving image comprising a plurality of image frames;
  segment the first still image to obtain a first feature region in the first still image;
  acquire a binary mask image of the first feature region; and
  perform image fusion on the first still image and the plurality of image frames based on the binary mask image to obtain a second moving image.

In an example, the processor is further configured to perform the instructions to:
  process the first still image using a preset depth convolutional neural network to acquire the first feature region by performing segmentation on the first still image.

In an example, the processor is further configured to perform the instructions to:

extract semantic feature layers at two or more scales from the first still image based on a pre-trained network;

learn all the extracted semantic feature layers using a preset optimization network to obtain features at respective scales;

merge and interpolate the features at the respective scales using the preset optimization network; and train the optimization network using the merged and interpolated features to predict the first still image and acquire the first feature region by performing segmentation on the first still image, and output the first feature region acquired in a binary mask image manner.

In an example, the processor is further configured to perform the instructions to, prior to performing segmentation on the first still image, train the depth convolutional neural network using a preset loss function as an objective function;

wherein the loss function is $$\text{Loss} = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

In an example, the processor is further configured to perform the instructions to, prior to fusing the first still image with the plurality of image frames, decompose each of the plurality of image frames into a plurality of color channel images;

calculate a pixel mean value of each of the plurality of color channel images to obtain a primary tone reference image $I_{ref}$;

perform Gaussian blurring processing on a second feature region $I_{gd}$ of the first still image at a preset scale of the two or more scales to obtain a blurred image $I_{blur}$; and perform color correction on the second feature region $I_{gd}$ according to following equation to obtain a corrected image $I_{cal}$:

$$I_{cal} = I_{gd} * \alpha + I_{gd} * (I_{ref}/I_{blur}) * (1-\alpha);$$

wherein the second feature region $I_{gd}$ comprises other regions of the first still image expect for the first feature region, and α is a correction scale factor, wherein 0≤α≤1.

According to yet another aspect of the embodiments of the present disclosure, there is further provided an image processing apparatus, comprising:

an acquisition module configured to acquire a first still image, and acquire a first moving image comprising a plurality of image frames;

a segmentation module configured to segment the first still image to obtain a first feature region in the first still image, and acquire a binary mask image of the first feature region; and a fusion module configured to perform image fusion on the first still image and the plurality of image frames based on the binary mask image to obtain a second moving image.

In an example, the segmentation module is further configured to:

process the first still image using a preset depth convolutional neural network to acquire the first feature region by performing segmentation on the first still image.

In an example, the segmentation module is further configured to:

extract semantic feature layers at two or more scales from the first still image based on a pre-trained network;

learn all the extracted semantic feature layers using a preset optimization network to obtain features at respective scales;

merge and interpolate the features at the respective scales using the optimization network; and train the optimization network using the merged and interpolated features to predict the first still image and acquire the first feature region by performing segmentation on the first still image, and output the first feature region acquired in a binary mask image manner.

In an example, the apparatus further comprises: an error processing module configured to:

train the depth convolutional neural network using a preset loss function as an objective function;

wherein the loss function is $$\text{Loss} = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

In an example, the apparatus further comprises: a correction unit configured to:

decompose each of the plurality of image frames into a plurality of color channel images;

calculate a pixel mean value of each of the plurality of color channel images to obtain a primary tone reference image $I_{ref}$;

perform Gaussian blurring processing on a second feature region $I_{gd}$ of the first still image at a preset scale of the two or more scales to obtain a blurred image $I_{blur}$; and perform color correction on the second feature region $I_{gd}$ according to following equation to obtain a corrected image $I_{cal}$:

$$I_{cal} = I_{gd} * \alpha + I_{gd} * (I_{ref}/I_{blur}) * (1-\alpha);$$

wherein the second feature region $I_{gd}$ comprises other regions of the first still image expect for the first feature region, and α is a correction scale factor, wherein 0≤α≤1.

According to a further aspect of the embodiments of the present disclosure, there is further provided a computer readable storage medium having stored therein computer executable instructions for performing the image processing method described above.

Other features and advantages of the present disclosure will be set forth in the specification which follows, and partially become apparent from the specification, or may be understood from the practice of the present disclosure. The purposes and other advantages of the present disclosure may be realized and acquired by structures particularly pointed out in the specification, the claims and the accompanying drawings.

BRIEF DESCRIPTION OF THE DRAWINGS

The accompanying drawings are used to provide a further understanding of the technical solutions of the present disclosure, and constitute a part of the specification. The accompanying drawings are used together with the embodiments of the present application to explain the technical solutions of the present disclosure, and do not constitute a limitation of the technical solutions of the present disclosure.

DETAILED DESCRIPTION

In order to make the purposes, technical solutions and advantages of the present disclosure more obvious and apparent, the embodiments of the present disclosure will be described in detail below with reference to the accompanying drawings. It should be illustrated that, the embodiments in the present application and the features in the embodiments may be randomly combined with each other without conflict.

The steps illustrated in the flowcharts of the accompanying drawings may be executed in a computer system comprising, for example, a group of computer executable instructions. Further, although logical orders are shown in the flowcharts, in some cases, the steps shown or described may be performed in an order different from those described herein.

Figure 1:
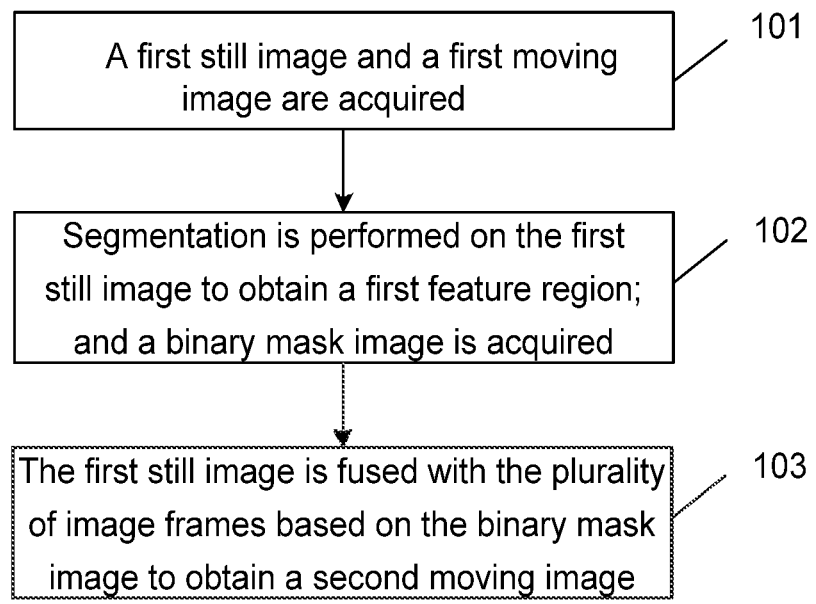
FIG. 1 is a flowchart of an image processing method according to an embodiment of the present disclosure.

FIG. 1 is a flowchart of an image processing method according to an embodiment of the present disclosure. As shown in FIG. 1, the image processing method according to the embodiment of the present disclosure may comprise the following steps.

In step S101, a first still image is acquired; and a first moving image comprising a plurality of image frames is acquired.

In step S102, segmentation is performed on the first still image to obtain a first feature region in the first still image; and a binary mask image of the first feature region is acquired.

It should be illustrated that acquiring a binary mask image comprises: assigning different parameter values to regions which need to be distinguished. For example, pixels in the first feature region may be assigned a value of 1, and other regions in the first still image except for first feature region are assigned a value of 0. After the above assignment processing, the first feature region may be directly distinguished.

For example, in the embodiment of the present disclosure, performing segmentation on the first still image may comprise:

processing the first still image using a preset depth convolutional neural network to acquire the first feature region by performing segmentation on the first still image.

For example, in the embodiment of the present disclosure, processing the first still image using a preset depth convolutional neural network may comprise:

extracting semantic feature layers at two or more scales from the first still image based on a pre-trained network;

learning all the extracted semantic feature layers using a preset optimization network to obtain features at respective scales;

merging and interpolating the features at the respective scales using the optimization network; and training the optimization network using the merged and interpolated features to predict the first still image and acquire the first feature region by performing segmentation on the first still image, and outputting the acquired first feature region in a binary mask image manner.

It may be understood that extracting semantic feature layers from the first still image may comprise: extracting the semantic feature layers from the first still image at different scales. It may be understood by those skilled in the art that the term "scales" here may refer to respective scales in "multi-scale analysis."

Figure 2:
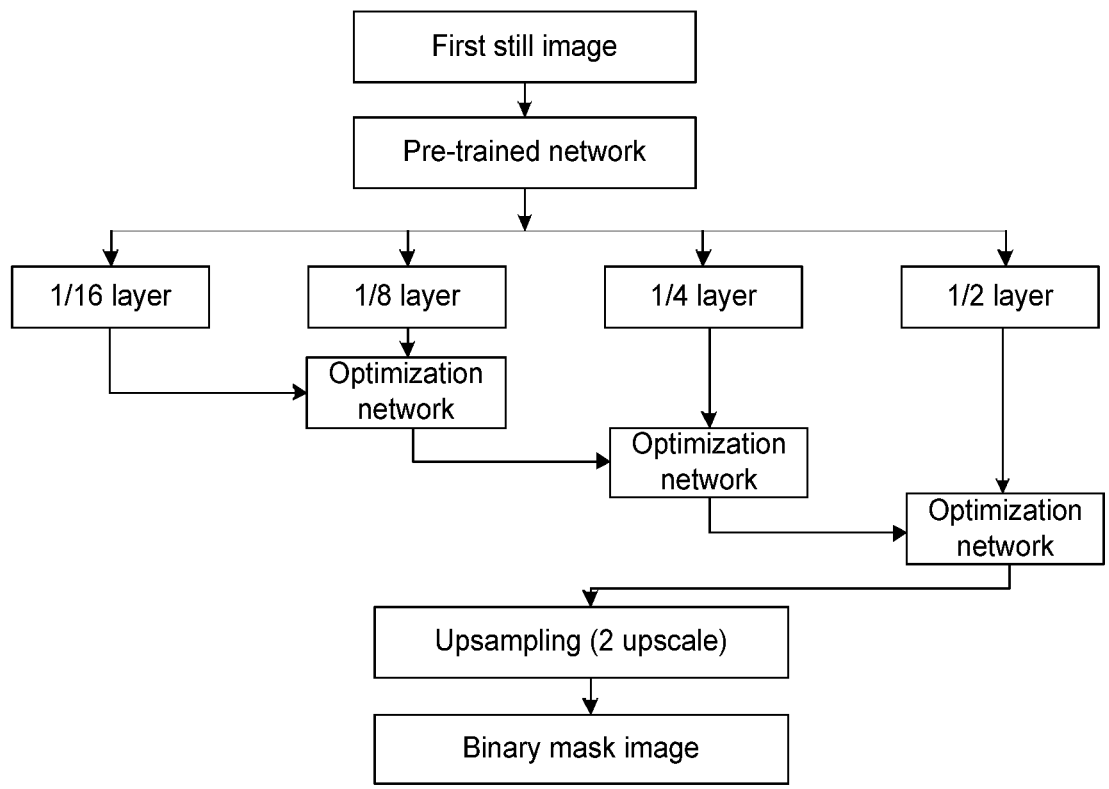
FIG. 2 is a schematic flowchart of a process performed by a depth convolutional neural network according to an embodiment of the present disclosure.

FIG. 2 is a flowchart of a process performed by a depth convolutional neural network according to an embodiment of the present disclosure. As shown in FIG. 2, a first still image may be input into a pre-trained network such as a VGG-19 network, and features in $4^{th}$, $8^{th}$, $12^{th}$, and $16^{th}$ convolutional layers are output by the network as semantic feature layers at a ½ scale, a ¼ scale, a ⅛ scale and a 1/16 scale respectively, and then the semantic feature layers at respective scales are transmitted to a preset optimization network such as RefineNet for processing. It may be understood by those skilled in the art that other convolutional neural networks may also be used as the pre-trained network according to the embodiments of the present disclosure, as long as the semantic feature layers at the respective scales may be acquired. In an example of the present disclosure, the feature layers at different scales are further processed using the RefineNet network, to output a binary mask image of a first feature region acquired by segmentation. Of course, other convolutional neural networks may also be used as the preset optimization network.

For example, the optimization network according to the embodiments of the present disclosure may comprise at least a part of a residual convolutional unit, a fusion unit, and a chain residual pooling unit.

It may be understood that the network RefineNet used in the embodiments of the present disclosure may comprise a residual convolutional unit, a fusion unit (comprising a convolutional layer for feature extraction (CONV3*3, wherein each CONV is equivalent to a group of neurons for storing parameters of units of the neural network, but the CONV has the characteristics of local weight sharing of the neurons, and therefore is suitable for processing structured information of an image), upsampling and fusion (SUM)) and a chain residual pooling unit. The features at different scales may be processed by the residual convolutional unit respectively, to extract global features at the respective scales. Then, the global features are input to the fusion unit, to perform feature fusion on the global features at different scales, and semantic features in a low-frequency background are extracted from the fused features by the chain residual pooling unit, and are finally converted (CONV 3*3) to obtain semantic features at large scales for output. The upsampling performed in the depth convolutional neural network according to the embodiment of the present disclosure may comprise an interpolation operation, which will not be described in detail herein. Various CONVs may perform the same processing, and configured parameters may be adaptively adjusted by training. SUMs in various constitutional parts according to the embodiment of the present disclosure may perform the same processing, and configured parameters are adaptively adjusted by training.

Figure 3:
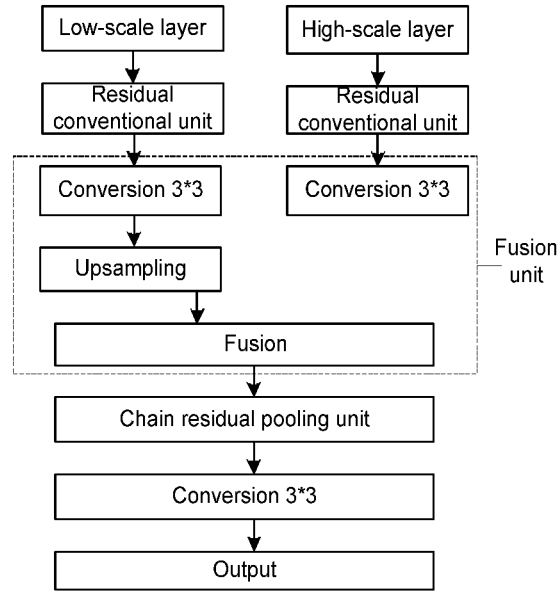
FIG. 3 is a schematic structural diagram of an optimization network according to an embodiment of the present disclosure.

FIG. 3 is a schematic structural diagram of an optimization network according to an embodiment of the present disclosure. As shown in FIG. 3, in the optimization network, feature layers at different scales are divided into a low-scale layer and a high-scale layer, and then global features at the respective scales are extracted by a residual convolutional unit. By taking FIG. 2 as an example, a 1/16 layer is set as a low-scale layer, and a 1/8 layer is set as a high-scale layer. Then, the extracted global features are input to a fusion unit, to perform feature fusion on the global features at the respective scales, and then semantic features in a low-frequency background are extracted from the global features at the respective scales by the chain residual pooling unit, to obtain semantic features at large scales for output.

Figure 4:
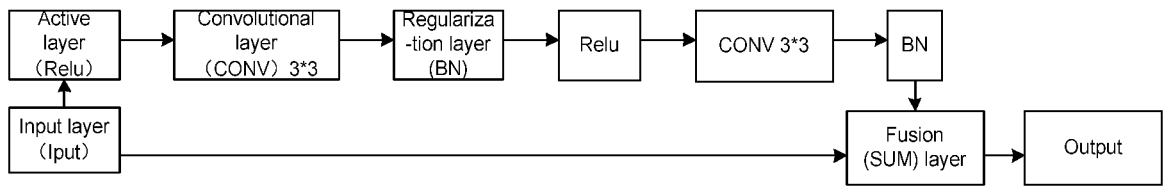
FIG. 4 is a constitutional structural diagram of a residual convolutional unit according to an embodiment of the present disclosure.

FIG. 4 is a constitutional structural diagram of a residual convolutional unit according to an embodiment of the present disclosure. As shown in FIG. 4, a low-scale layer and a high-scale layer are respectively input, and then parameters of a convolutional layer are nonlinearly processed by an active layer (Relu). The convolutional layer (CONV) is used to extract features from a feature image output from a previous layer. When the depth neural network is trained, a regularization layer (BN) may regularize parameters of the network to prevent gradient explosions during training. A fusion (SUM) layer is used for fusion processing.

Figure 5:
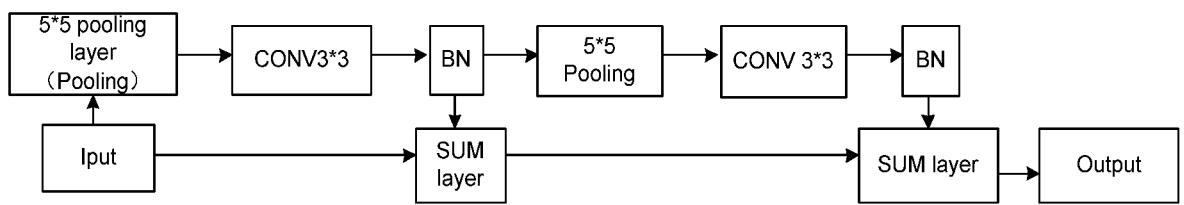
FIG. 5 is a constitutional structural diagram of a chain residual pooling unit according to an embodiment of the present disclosure.

FIG. 5 is a constitutional structural diagram of a chain residual pooling unit according to an embodiment of the present disclosure. As shown in FIG. 5, a pooling layer performs low-frequency filtering processing on an output feature image in FIG. 5. Processing of other constitutional parts is similar to that in FIG. 4, and relevant parameters may be adaptively adjusted by training the network.

In addition, according to the embodiment of the present disclosure, in the training process, a pre-objective function of VGG-19 may be directly imported, thereby saving training time. In addition, in an example of the present disclosure, the optimization network may be trained and tested using a skyFinder data set, and a ratio of an amount of data of a training set to an amount of data of a test set may be 9:1. The optimization network may be trained using a random gradient descent method, by, for example, setting a learning rate to $1^{e-4}$. For example, the skyFinder data set may have 46 scenes and more than 80,000 frames of images. During the training, in each iteration process, 20 frames of images are randomly extracted from each scene for training, that is, 900 frames of images are extracted during each iteration, 100 iterations are performed during the training, and 90,000 frames of images are involved in the training. In the images involved in the training, some images may be extracted multiple times, and some images may not extracted, which may prevent an over-fitting condition.

Next, in step 103, the first still image is fused with the plurality of image frames of the first moving image based on the binary mask image to obtain a second moving image.

For example, prior to performing segmentation on the first still image, the method according to the embodiment of the present disclosure may further comprise:
training the depth convolutional neural network using a preset loss function as an objective function;
wherein the loss function is $$\text{Loss} = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

For example, prior to the first still image is fused with image frames of the first moving image, the method according to the embodiment of the present disclosure further comprises:
decomposing the image frames of the first moving image; and
performing color correction on image frames in a second feature region of the first still image according to a primary tone of the first moving image,
wherein the second feature region comprises: other regions of the first still image except for the first feature region.

For example, according to an embodiment of the present disclosure, performing color correction on image frames in a second feature region of the first still image comprises:
determining the second feature region based on the binary mask image;
decomposing the first moving image into a plurality of color channel images;
calculating a pixel mean value of each of the plurality of color channel images to obtain a primary tone reference image $I_{ref}$;
performing Gaussian blurring processing on a second feature region $I_{gd}$ in the first still image at a preset scale of the two or more scales to obtain a blurred image $I_{blur}$; and
performing color correction on the second feature region $I_{gd}$ according to the following equation to obtain a corrected image $I_{cal}$:

$$I_{cal} = I_{gd}*\alpha + I_{gd}*(I_{ref}/I_{blur})*(1-\alpha);$$

where $\alpha$ is a correction scale factor and $0 \leq \alpha \leq 1$. In addition, an operator "*" represents a convolutional operation.

For example, the first still image may be a landscape image comprising a sky region, the first feature region comprises the sky region, and the first moving image is a moving sky image. For example, the plurality of color channel images comprise a RGB channel image or other color channel images.

It may be understood that, in an example, when the first feature region is the sky region, the second feature region may be other regions except for the sky region, for example, a ground region, which may be determined by those skilled in the art according to the requirements of image fusion.

For example, according to an embodiment of the present disclosure, fusing the first still image with a plurality of image frames of the first moving image may comprise: fusing the first still image with the plurality of image frames by Laplace transform.

It may be understood that the Laplacian transform-based fusion method performs Laplacian decomposition on two frames of images to be fused using the same number of decomposition layers respectively. Here, Gaussian decomposition is performed on the binary mask image using the same number of decomposition layers as that of a Laplacian pyramid. Then, in each layer, the corresponding images to be fused are fused with the binary mask image in this layer in proportion using a fusion equation as follows:

$$I_l = I_l^1 * (1 - Mask_l) + I_l^2 * Mask_l$$

where l represents a number of pyramid layers, and $I_l^1$, $I_l^2$, $Mask_l$ represent images $I_1$ and $I_2$ to be fused in this layer and a corresponding mask image Mask respectively. After the images in various layers are fused, the images are reconstructed using a Laplacian pyramid, to finally obtain a fusion result.

Figure 6:
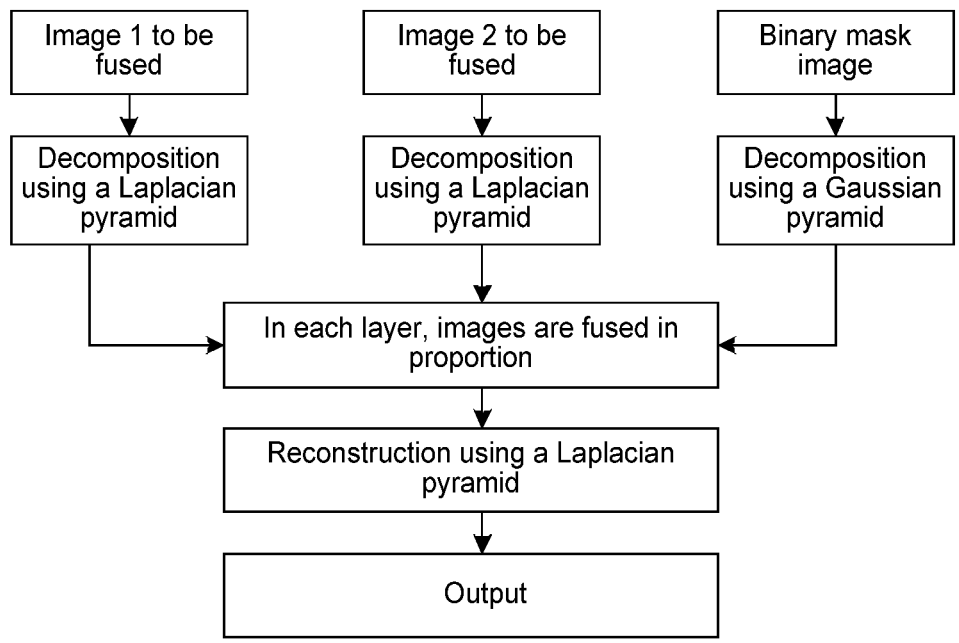
FIG. 6 is a schematic flowchart of a fusion process according to an embodiment of the present disclosure.

FIG. 6 is a schematic flowchart of image fusion processing according to an embodiment of the present disclosure. As shown in FIG. 6, the image fusion may comprise: performing decomposition on an image 1 to be fused (which may be the first still image) and an image 2 to be fused (which may be the first moving image) using Laplace transform respectively, and performing decomposition on a binary mask image using Gaussian transform; fusing decomposed images in each layer with a binary mask in proportion; and reconstructing the fused images in each layer using a Laplacian pyramid to obtain a fused image.

Figure 7:
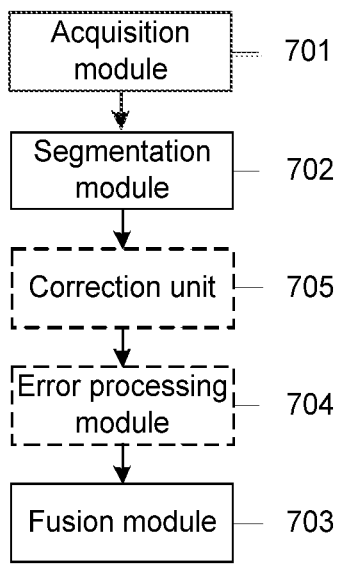
FIG. 7 is an exemplary structural block diagram of an image processing apparatus according to an embodiment of the present disclosure.

FIG. 7 is an exemplary structural block diagram of an image processing apparatus according to an embodiment of the present disclosure. As shown in FIG. 7, the image processing apparatus 70 may comprise an acquisition module 701, a segmentation module 702, and a fusion module 703.

The acquisition module 701 may be configured to acquire a first still image; and acquire a first moving image comprising a plurality of image frames. The segmentation module 702 is configured to segment the first still image to obtain a first feature region in the first still image; and acquire a binary mask image of the first feature region.

For example, the segmentation module 702 may process the first still image using a preset depth convolutional neural network to acquire the first feature region by performing segmentation on the first still image.

For example, the segmentation module 702 may further be configured to extract semantic feature layers at two or more scales from the first still image based on a pre-trained network; learn all the extracted semantic feature layers using a preset optimization network to obtain features at respective scales; merge and interpolate the features at the respective scales using the optimization network; and train the optimization network using the merged and interpolated features to predict the first still image and acquire the first feature region by performing segmentation on the first still image, and outputting the acquired first feature region in a binary mask image manner.

It may be understood that extracting semantic feature layers from the first still image may comprise: extracting the semantic feature layers from the first still image at different scales. For example, a first still image may be input into a VGG-19 network, and features output from $4^{th}$, $8^{th}$, $12^{th}$, and $16^{th}$ convolutional layers are acquired from the first still image as semantic feature layers at a ½ scale, a ¼ scale, a ⅛ scale and a ¹⁄₁₆ scale respectively, and are transmitted to an optimization network RefineNet for processing.

For example, the optimization network may comprise at least a part of a residual convolutional unit, a fusion unit, and a chain residual pooling unit.

It should be illustrated that the network RefineNet used in the embodiments of the present disclosure may comprise a residual convolutional unit, a fusion unit and a chain residual pooling unit. The features at different scales may be processed by the residual convolutional unit respectively, to extract global features at the respective scales. Then, the global features are input to the fusion unit, to perform feature fusion on the global features at different scales, and semantic features in a low-frequency background are extracted from the fused features by the chain residual pooling unit, and semantic features at large scales are output.

The fusion module 703 fuses the first still image with the image frames of the first moving image based on the binary mask image to obtain a second moving image.

The image processing apparatus according to the embodiment of the present disclosure further comprises: an error processing module 704 configured to train the depth convolutional neural network using a preset loss function as an objective function;

wherein the loss function is $$Loss = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

The image processing apparatus according to the embodiment of the present disclosure may further comprise: a correction unit 705 configured to decompose the image frames of the first moving image; and perform color correction on image frames in a second feature region of the first still image according to a primary tone of the first moving image.

For example, the correction unit 705 according to the embodiment of the present disclosure is further configured to:

determine the second feature region based on the binary mask image;

decompose the first moving image into a plurality of color channel images;

calculate a pixel mean value of each of the plurality of color channel images to obtain a primary tone reference image $I_{ref}$;

perform Gaussian blurring processing on a second feature region $I_{gd}$ in the first still image at a preset scale of the two or more scales to obtain a blurred image $I_{blur}$; and perform color correction on the second feature region $I_{gd}$ according to the following equation to obtain a corrected image $I_{cal}$:

$$I_{cal} = I_{gd} * \alpha + I_{gd} * (I_{ref}/I_{blur}) * (1-\alpha);$$

where $\alpha$ is a correction scale factor and $0 \leq \alpha \leq 1$. In addition, an operator "*" represents a convolutional operation.

Figure 8:
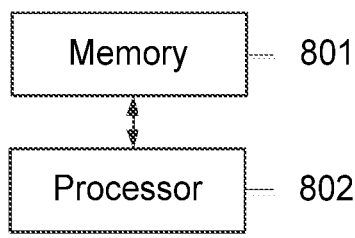
FIG. 8 is another exemplary structural block diagram of an image processing apparatus according to an embodiment of the present disclosure.

FIG. 8 is another exemplary structural block diagram of an image processing apparatus according to an embodiment of the present disclosure. As shown in FIG. 8, the image processing apparatus 80 may comprise a memory 801 having stored therein instructions, and a processor 802 configured to execute the instructions to perform the image processing method according to the embodiment of the present disclosure, which will not be described in detail here for brevity.

The embodiments of the present disclosure further provide a computer storage medium having stored therein computer executable instructions for performing the image processing method described above.

The method according to the embodiments of the present disclosure will be described in detail below by means of application examples, which are merely used to illustrate the present disclosure and are not intended to limit the protection scope of the present disclosure.

Figure 9:
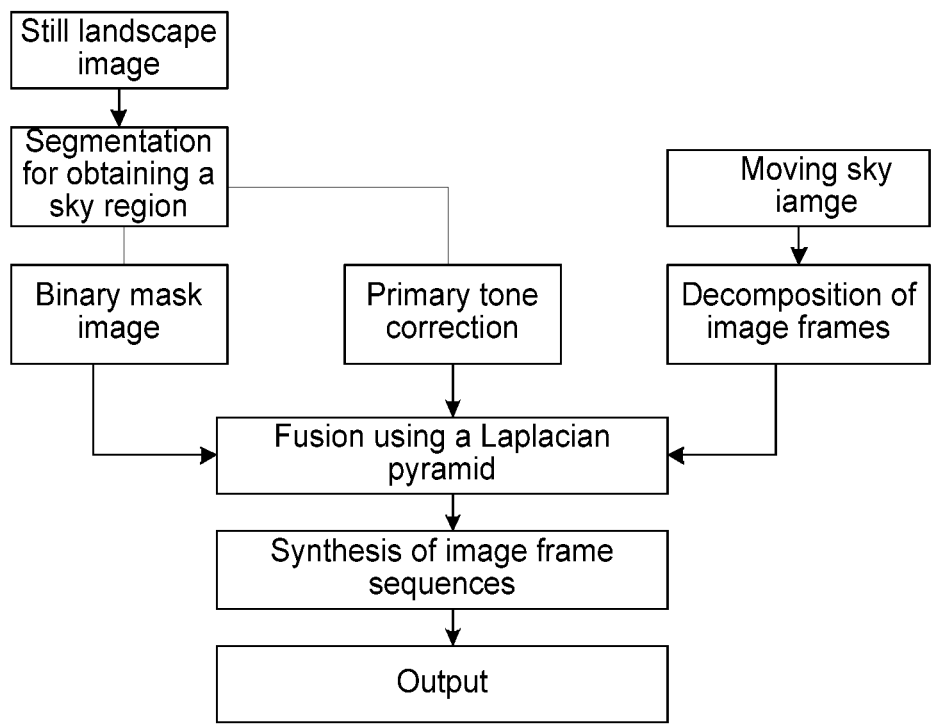
FIG. 9 is a schematic diagram of applying an exemplary image processing process according to the present disclosure.

FIG. 9 is a schematic diagram of applying an exemplary image processing process according to an embodiment of the present disclosure. As shown in FIG. 9, in an application example of the present disclosure, segmentation is performed on an input still landscape image (the first still image) comprising a sky region (the first feature region) to obtain the sky region, so as to acquire a binary mask image of the sky region. At the same time, an image frame sequence of a moving sky image (the first moving image) is acquired and decomposed, and color correction is performed with reference to a primary tone of the sky region of the still landscape image. Then, based on a binary mask image, image frames of the input moving sky image are fused with the still landscape image using a Laplacian pyramid. Finally, the fused image frame sequences are synthesized into a moving frame sequence to achieve the purpose of enabling the still landscape image to become "a moving image".

It can be understood by those of ordinary skill in the art that all or a part of steps in the above methods may be performed by a program instructing related hardware (for example, a processor), which may be stored in a computer readable storage medium, such as a read only memory, a disk or an optical disk etc. All or a part of the steps in the above embodiments may also be implemented using one or more integrated circuits. Correspondingly, each module/unit in the above embodiments may be implemented in a form of hardware, for example, corresponding functions thereof may be implemented using an integrated circuit, or may be implemented in a form of a software function module, for example, corresponding functions thereof are implemented by a processor executing programs/instructions stored in a memory. The present disclosure is not limited to any specific form of combination of hardware and software.

Although the embodiments disclosed in the present disclosure are as described above, the content described is merely implementations used to facilitate the understanding of the present disclosure, and is not intended to limit the present disclosure. Any modification and variation in forms and details of the implementations may be made by those skilled in the art without departing from the spirit and scope of the disclosure, but the protection scope of the present disclosure is defined by the scope of the appended claims.

I claim:

1. An image processing method, comprising:
acquiring a first still image;
acquiring a first moving image comprising a plurality of image frames;
performing segmentation on the first still image to obtain a first feature region in the first still image;
acquiring a binary mask image of the first feature region; and
performing image fusion on the first still image and the plurality of image frames based on the binary mask image to obtain a second moving image,
wherein performing segmentation on the first still image comprises:
processing the first still image using a preset depth convolutional neural network to acquire the first feature region by performing segmentation on the first still image, comprising:
extracting semantic feature layers at two or more scales from the first still image based on a pre-trained network;
learning all the extracted semantic feature layers using a preset optimization network to obtain features at respective scales;
merging and interpolating the features at the respective scales using the optimization network; and
training the optimization network using the merged and interpolated features to predict the first still image and acquire the first feature region by performing segmentation on the first still image, and outputting the first feature region acquired in a binary mask image manner.

2. The method according to claim 1, further comprising: prior to performing segmentation on the first still image,
training the depth convolutional neural network using a preset loss function as an objective function;
wherein the loss function is $$Loss = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

3. The method according to claim 1, further comprising: prior to fusing the first still image with the plurality of image frames,
decomposing each of the plurality of image frames into a plurality of color channel images;
calculating a pixel mean value of each of the plurality of color channel images to obtain a primary tone reference image $I_{ref}$;
performing Gaussian blurring processing on a second feature region $I_{gd}$ of the first still image at a preset scale of the two or more scales to obtain a blurred image $I_{blur}$; and
performing color correction on the second feature region $I_{gd}$ according to following equation to obtain a corrected image $I_{cal}$:

$$I_{cal} = I_{gd}*\alpha + I_{gd}*(I_{ref}/I_{blur})*(1-\alpha);$$

wherein the second feature region $I_{gd}$ comprises other regions of the first still image expect for the first feature region, and $\alpha$ is a correction scale factor, wherein $0 \leq \alpha \leq 1$.

4. A non-transitory computer readable storage medium having stored therein computer executable instructions for performing the image processing method according to claim 1.

5. An image processing apparatus, comprising:
a memory having instructions stored thereon; and a processor configured to perform the instructions to:
acquire a first still image;
acquire a first moving image comprising a plurality of image frames;
segment the first still image to obtain a first feature region in the first still image;
acquire a binary mask image of the first feature region; and
perform image fusion on the first still image and the plurality of image frames based on the binary mask image to obtain a second moving image; and
process the first still image using a preset depth convolutional neural network to acquire the first feature region by performing segmentation on the first still image;
wherein the processor is further configured to perform the instructions to:
extract semantic feature layers at two or more scales from the first still image based on a pre-trained network;
learn all the extracted semantic feature layers using a preset optimization network to obtain features at respective scales;
merge and interpolate the features at the respective scales using the preset optimization network; and
train the optimization network using the merged and interpolated features to predict the first still image and acquire the first feature region by performing segmentation on the first still image, and output the first feature region acquired in a binary mask image manner.

6. The apparatus according to claim 5, wherein the processor is further configured to perform the instructions to, prior to performing segmentation on the first still image, train the depth convolutional neural network using a preset loss function as an objective function;
wherein the loss function is $$\text{Loss} = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

7. The apparatus according to claim 5, wherein the processor is further configured to perform the instructions to, prior to fusing the first still image with the plurality of image frames,
decompose each of the plurality of image frames into a plurality of color channel images;
calculate a pixel mean value of each of the plurality of color channel images to obtain a primary tone reference image $I_{ref}$;
perform Gaussian blurring processing on a second feature region $I_{gd}$ of the first still image at a preset scale of the two or more scales to obtain a blurred image $I_{blur}$; and
perform color correction on the second feature region image $I_{gd}$ according to following equation to obtain a corrected image $I_{cal}$:

$$I_{cal} = I_{gd} * \alpha + I_{gd} * (I_{ref}/I_{blur}) * (1-\alpha)$$

wherein the second feature region $I_{gd}$ comprises other regions of the first still image expect for the first feature region, and α is a correction scale factor, wherein 0≤α≤1.

8. An image processing apparatus, comprising:
an acquisition module configured to acquire a first still image, and acquire a first moving image comprising a plurality of image frames;
a segmentation module configured to segment the first still image to obtain a first feature region in the first still image, and acquire a binary mask image of the first feature region; and
a fusion module configured to perform image fusion on the first still image and the plurality of image frames based on the binary mask image to obtain a second moving image,
wherein the segmentation module is further configured to:
process the first still image using a preset depth convolutional neural network to acquire the first feature region by performing segmentation on the first still image;
extract semantic feature layers at two or more scales from the first still image based on a pre-trained network;
learn all the extracted semantic feature layers using a preset optimization network to obtain features at respective scales;
merge and interpolate the features at the respective scales using the optimization network; and
train the optimization network using the merged and interpolated features to predict the first still image and acquire the first feature region by performing segmentation on the first still image, and output the first feature region acquired in a binary mask image manner.

9. The apparatus according to claim 8, further comprising:
an error processing module configured to:
train the depth convolutional neural network using a preset loss function as an objective function;
wherein the loss function is $$\text{Loss} = \frac{1}{H \times W} \sum_{i \in H, j \in W} (I'_{ij} - I_{ij})^2,$$

where $I_{ij}'$ is a predicted image of the first feature region, $I_{ij}$ is an actual image of the first feature region acquired by the segmentation, H is a number of rows of an image matrix of the first feature region, W is a number of columns of the image matrix of the first feature region, i is a row number of a pixel, and j is a column number of the pixel.

10. The apparatus according to claim 8, further comprising: a correction unit configured to:
decompose each of the plurality of image frames into a plurality of color channel images;
calculate a pixel mean value of each of the plurality of color channel images to obtain a primary tone reference image $I_{ref}$;
perform Gaussian blurring processing on a second feature region $I_{gd}$ of the first still image at a preset scale of the two or more scales to obtain a blurred image $I_{blur}$; and
perform color correction on the second feature region $I_{gd}$ according to following equation to obtain a corrected image $I_{cal}$:

$$I_{cal} = I_{gd} * \alpha + I_{gd} * (I_{ref}/I_{blur}) * (1-\alpha)$$

wherein the second feature region $I_{gd}$ comprises other regions of the first still image expect for the first feature region, and a is a correction scale factor, wherein $0 \leq \alpha \leq 1$.

* * * * *